A. D. CARDWELL.
TELEGRAPH TRANSMITTER.
APPLICATION FILED JAN. 15, 1913. RENEWED OCT. 29, 1914.

1,194,357.

Patented Aug. 15, 1916.
5 SHEETS—SHEET 4.

Witnesses:
Marie I. Wainright
Jacob Lichtenstein

Inventor
A. D. Cardwell
By Attorney
T. F. Bourne

A. D. CARDWELL.
TELEGRAPH TRANSMITTER.
APPLICATION FILED JAN. 15, 1913. RENEWED OCT. 29, 1914.

1,194,357.

Patented Aug. 15, 1916.
5 SHEETS—SHEET 5.

Witnesses:

Inventor
A. D. Cardwell
By his Attorney

UNITED STATES PATENT OFFICE.

ALLEN D. CARDWELL, OF NEW YORK, N. Y.

TELEGRAPH-TRANSMITTER.

1,194,357.   Specification of Letters Patent.   Patented Aug. 15, 1916.

Application filed January 15, 1913, Serial No. 742,111. Renewed October 29, 1914. Serial No. 869,349.

*To all whom it may concern:*

Be it known that I, ALLEN D. CARDWELL, a citizen of the United States, and resident of New York city, borough of Brooklyn, in the county of Kings and State of New York, have invented certain new and useful Improvements in Telegraph-Transmitters, of which the following is a specification.

My invention relates to improvements in mechanisms for transmitting electric impulses or signals to thereby effect the operation of suitable receiving instruments to print or otherwise indicate the corresponding characters or signals, the particular transmitting mechanisms I have invented being applicable to a variety of such instruments and more particularly to that class of instruments known as telegraph typewriters.

The general object of my invention is to provide such a mechanism which will be accurate, rapid and reliable in operation, and of simple, compact and durable construction. My apparatus is therefore constructed with a view to the provision of means for controlling the transmission of electric impulses; and operating means therefor comprising a keyboard similar to that of an ordinary typewriter, or some similar or equally convenient mechanism, to be operated manually by the operator.

Another object of my invention is to prevent the sending of undesired signals and as part of the apparatus for this purpose, I provide means for retaining effective, for a given length of time, the controlling means which are operated by the manipulation of the operating means therefor, and for retaining ineffective the controlling means not so operated.

Another object is the provision of a novel contact-making device and reliable and efficient operating means therefor, which shall be positive in action and eliminate, as far as possible, inaccuracies of movement due to inertia, momentum and friction.

Another object is the provision of a transmitting mechanism, all of the parts, of which are normally at rest, the necessary operating parts and the source of power for operating the same, being set in motion for the transmission of each character or signal, and automatically brought to rest when such transmission is complete.

My invention further comprises novel details of improvement and combinations of parts that will be more fully hereinafter set forth and then pointed out in the claims.

In the particular embodiment shown herein, which is intended to illustrate an operative form of my apparatus only, and not the only form it may take, I provide means for transmitting groups of impulses over the line to the receiving instruments. The groups are made to differ from one another by varying the character of the component impulses and the different groups are adapted to cause the receiving instruments to print or otherwise indicate the corresponding characters or signals. I have shown means for transmitting a group of three impulses on the line for each depression of a key, and the impulses of each group may be of long or short, or of long and short, duration as required, and may be positive or negative, or positive and negative, in the desired sequence.

It will thus be seen that the form of my invention illustrated herein is one of its most highly developed and complicated ones, since it is adapted for use with impulses of four different kinds, viz.: positive, negative, long and short. Such refinement may not, however, be necessary, and my apparatus may be used in connection with impulses which differ in duration only, differ in direction only, or which differ neither in direction nor in duration. Also, since it is well known that impulses can be transmitted through the ether without the aid of a metallic line, I do not wish to limit myself to the use of such a line as a transmitting medium. Nor do I wish to limit my invention to the particular means herein disclosed, in any respect, since obviously many changes may be made therein without departing from the spirit of my invention.

My invention further comprises novel details of improvement and combinations of parts that will be more fully hereinafter set forth and then pointed out in the claims.

Reference is to be had to the accompanying drawings forming part hereof, wherein, Fig. 1ª is a sectional detail view of keys and a circuit controlling bar; Fig. 5ª is a detail face view of the circuit controlling shaft.

Similar numerals of reference indicate corresponding parts in the several views.

The numeral 1 indicates a suitable frame in which a series of key levers 2 are pivoted, as upon a rod or shaft 3, and which may be held in the upward position by springs 4, stop bar 5 controlling the upward movement of the key levers, and the said key levers are shown provided with key buttons 2ª all of which may be arranged in any well known manner, as in the manner of a typewriting machine. A spacing bar 6 carried by arms 6ª pivoted upon rod 3 may also be arranged in the manner of the spacing bar in a typewriting machine. A universal bar 7 is pivotally mounted in the frame upon a cross rod 8, beneath the keys and spacing bar, to be actuated upon the depression of any of the latter to close a circuit as hereinafter explained.

Figure 9:
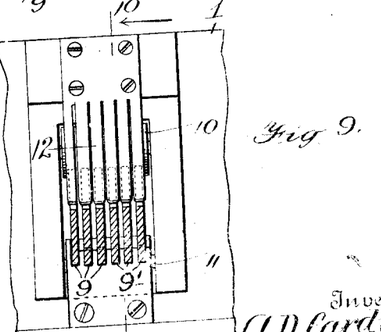
Fig. 9 is a detail sectional view on the line 9, 9, in Fig. 1, looking in the direction of the arrow, the section being also shown in Fig. 10.
Figure 10:
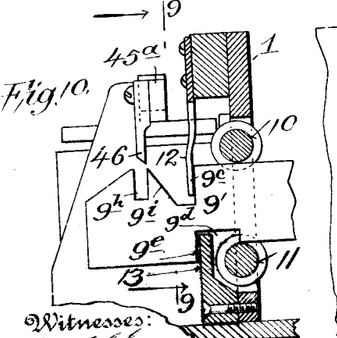
Fig. 10 is a section on the line 10, 10, in Fig. 9.

Beneath the keys and spacing bar are a desired number of circuit controlling bars 9, 9′, suitably slidably supported on edge beneath the keys and spacing bar. I have shown three of such bars 9 and three of such bars 9′, guided for longitudinal movement in the frame, and to reduce friction upon said bars and maintain them in their proper positions, I have shown grooved rollers 10, 11 at opposite ends of the frame pivotally supported in the frame above and below said bars, serving also to limit lateral play of said bars. The bars 9, 9′, are provided in their upper edges with recesses 9ª having suitably disposed downwardly inclined edges 9ᵇ, the keys 2 being at right angles to said bars (Fig. 1ª) and in such positions that when a key is depressed it will engage the edge 9ᵇ of one or more bars 9, 9′, to cause the latter to slide the required distance to the left in Fig. 1. The bars 9, 9′ that are not to be moved by the depression of any given key are cut away in opposition to the inclined edge or edges 9ᵇ of the bar or bars that are to be operated by such key, to thereby prevent operation of the undesired bars upon the depression of a given key. Bars 9, 9′ are maintained pressed toward the right in Fig. 1 in their normal positions, for which purpose I have shown springs 12 engaging shoulders 9ᶜ on said bars, and said bars have suitable notches 9ᵈ providing shoulders 9ᵉ to engage stop 13, whereby said bars are held in normal position (see Figs. 9 and 10). Said bars 9, 9′, in connection with their actuating means are adapted to control the impulses sent over the line and in the present embodiment accomplish this by shifting the movable members 14, 15 (Figs. 1 and 2) to determine the character and duration of the impulses, viz.: whether positive or negative and whether short or long. It will be understood that if it is desired to transmit impulses which have the same duration or the same direction, or both the same duration and direction, this impulse controlling mechanism should be correspondingly varied. For the purpose of illustration, the parts are so arranged that when a bar 9 is in the normal position, (Figs. 1 and 2) positive current will be sent on the line, and when such bar is shifted negative current will be sent on the line, and when a bar 9′ is in the normal position one character of impulse, such as short, will be sent on the line, and when such bar 9′ is shifted a different character of impulse, such as long, will be sent on the line. The arrangement also is such that any of the bars 9 and 9′ may or may not be shifted by a key, or all the bars 9 and 9′ may be shifted simultaneously by a key, and for one combination or character of impulse sent it will not be necessary to shift any of the bars 9 or 9′, as hereinafter described.

Figures 1, 2:
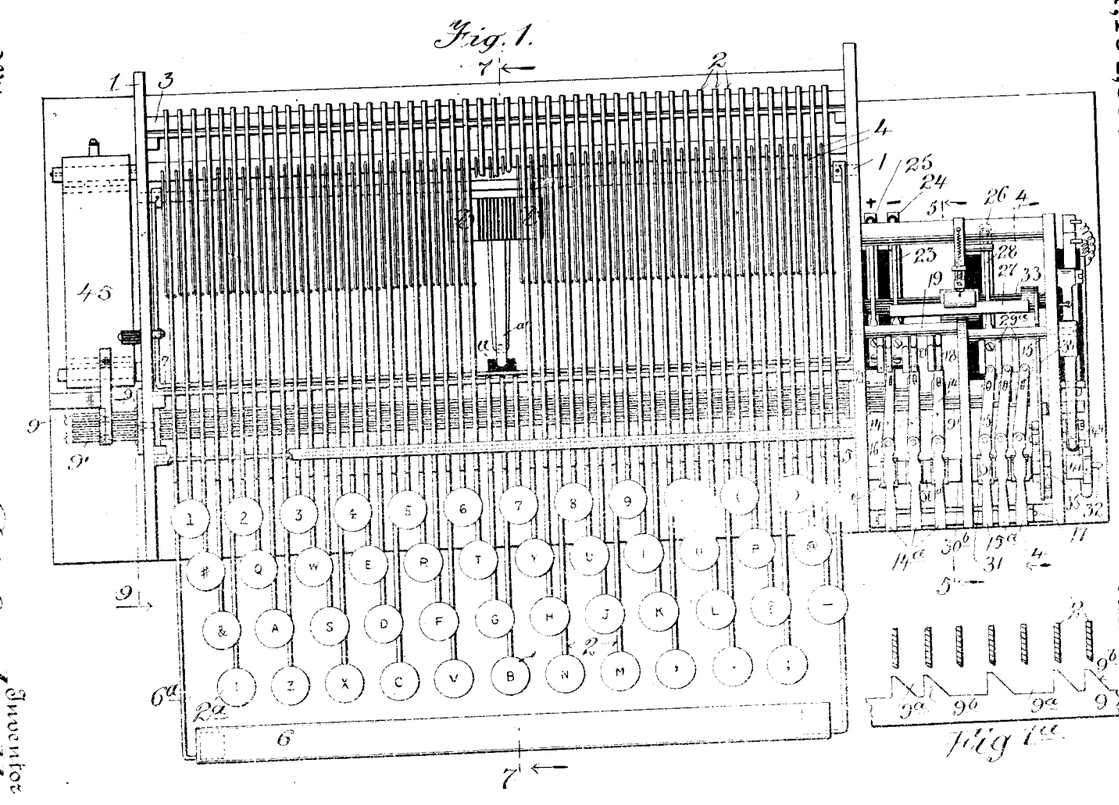
Figure 1 is a plan view of a transmitter embodying my invention, parts being removed for the sake of clearness.
Fig. 2 is an enlarged plan view of a portion of Fig. 1.
Figure 4:
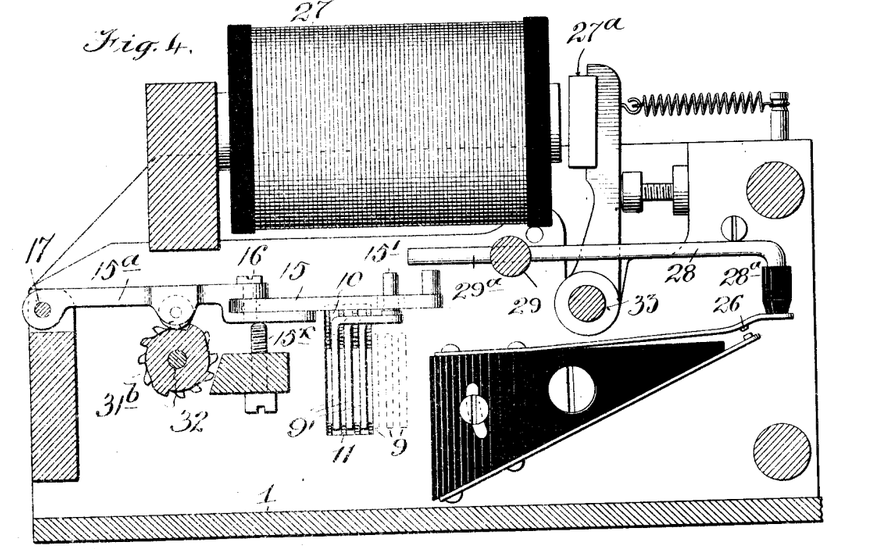
Fig. 4 is a section, enlarged, on the line 4, 4, in Fig. 1, illustrating the position of magnet 27.
Figure 5:
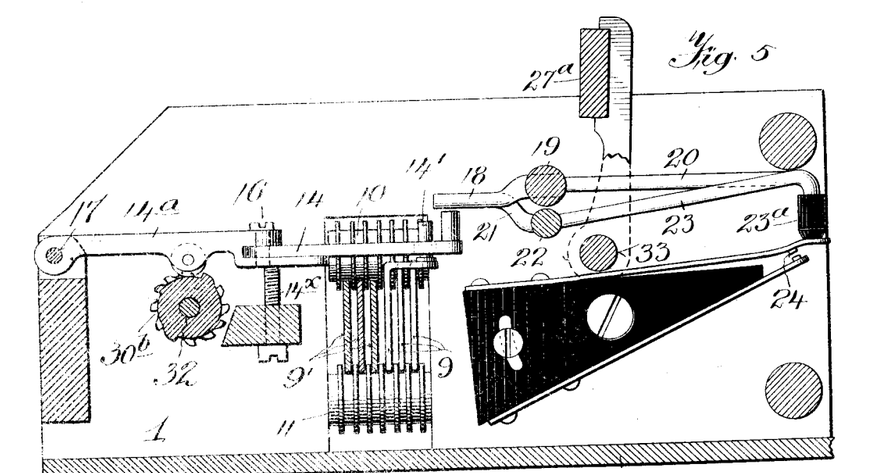
Fig. 5 is a similar view on the line 5, 5, in Fig. 1, the magnet 27 being omitted.
Figure 5A:
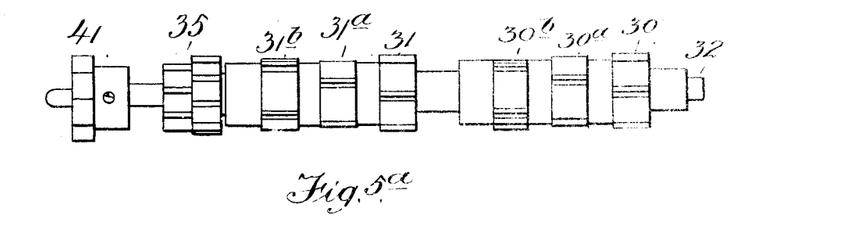

The members 14 and 15 are shown movably connected with corresponding bars 9, 9′ by pin and slot connections 14′, 15′. Said members are not only adapted to be shifted laterally, but are adapted to rock to control the corresponding character of impulses. For this purpose said members are shown pivotally supported upon corresponding rock-arms 14ª, 15ª, to which said members are respectively pivotally connected as at 16, (Fig. 2). The members 14ª, 15ª are pivotally supported on rod or shaft 17 carried by frame 1 (Figs. 2, 4 and 5). The members 14 are shown respectively normally beneath projections 18 from shaft 19 that is pivotally supported in the frame, which shaft carries an arm 20, and when any of said members 14 are shifted from the normal position by the corresponding bar 9 such member will pass under a projection 21 extending from a shaft 22 mounted in the frame (Fig. 5), which shaft carries an arm 23. Arm 23 carries at its end insulation 23ª adapted to close normally open contact 24, and arm 20 has similar insulation adapted to close a corresponding normally open contact 25, (Fig. 2). The arrangement illustrated is such that when contact 24 is closed one character of current will be thrown on the line, such as negative, and when contact 25 is closed another character of current will be thrown on the line, such as positive, or vice versa.

To control the duration of the impulse sent on the line, I provide a normally open contact 26 (Figs. 2 and 4) in a short circuit around a magnet 27 (Figs. 4, 6 and 11), which circuit is controlled by the members 15. Contact 26 is operated by an arm 28 shown having insulation 28$^a$ (Fig. 4), which arm is carried by a rock shaft 29 suitably supported in frame 1, said shaft being shown provided with projections 29$^a$ to coact with members 15, (Fig. 2). As illustrated, members 15 are, by bars 9', normally held out of operative relation with respect to projections 29$^a$, but when bars 9' are shifted, their corresponding member 15 will be placed under the corresponding projection 29$^a$ to rock the latter and arm 28 to close contact 26 when such member 15 is raised. The downward movement of members 14, 15 may be controlled by adjustable stops 14$^x$, 15$^x$, (Figs. 4 and 5). Arms 14$^a$ and 15$^a$ are rocked, or raised and lowered, by means of suitable cams, and at such time (according to the position of the members 14 with respect to the projections 18 and 21 and the position of members 15 with respect to projections 29$^a$) the character of the impulses sent on the line, whether negative or positive, or long or short, will be determined. For this purpose I have shown cams 30, 30$^a$, 30$^b$, and 31, 31$^a$, 31$^b$, adapted, respectively, to coact with the arms 14$^a$ and 15$^a$. Said cams are secured to, or formed on shaft 32, mounted to rotate in frame 1. The cams 30, 30$^a$, 30$^b$, are set in such relation as to operate the arms 14$^a$ successively, and the cams 31, 31$^a$, 31$^b$, are set in such relation as to operate the arms 15$^a$ successively, as in the order from the top of Fig. 2 downwardly, the cams 30 and 31 being set to operate the corresponding arms 14$^a$, 15$^a$ together, the cams 30$^a$, 31$^a$, operating their corresponding arms 14$^a$, 15$^a$ together, and the cams 30$^b$, 31$^b$ operating their corresponding arms 14$^a$, 15$^a$ together. The controlling arrangement for the cams illustrated is such that while the cams operate step by step, three impulses of the desired polarity and of the required duration each will be sent on the line for each depression of a finger key. While any suitable mechanism may be provided for such purpose, I have shown the armature 27$^a$ of magnet 27 supported upon a rock shaft 33, journaled in frame 1 and having an arm 34 (Figs. 2 and 3) adapted to rotate shaft 32 step by step. For this purpose said shaft 32 is shown provided with ratchets 35 adapted to be engaged by spring pressed pawls 34$^a$, 34$^b$, pivotally carried by arm 34, said ratchets and pawls being so located and arranged that each time arm 34 rocks down and up, the shaft 32 will be rotated step by step, so that three impulses of magnet 27 will cause rotation of a pair of cams to cause pairs of arms 14$^a$ and 15$^a$ to be raised and lowered in the order before stated.

Figures 2, 3:
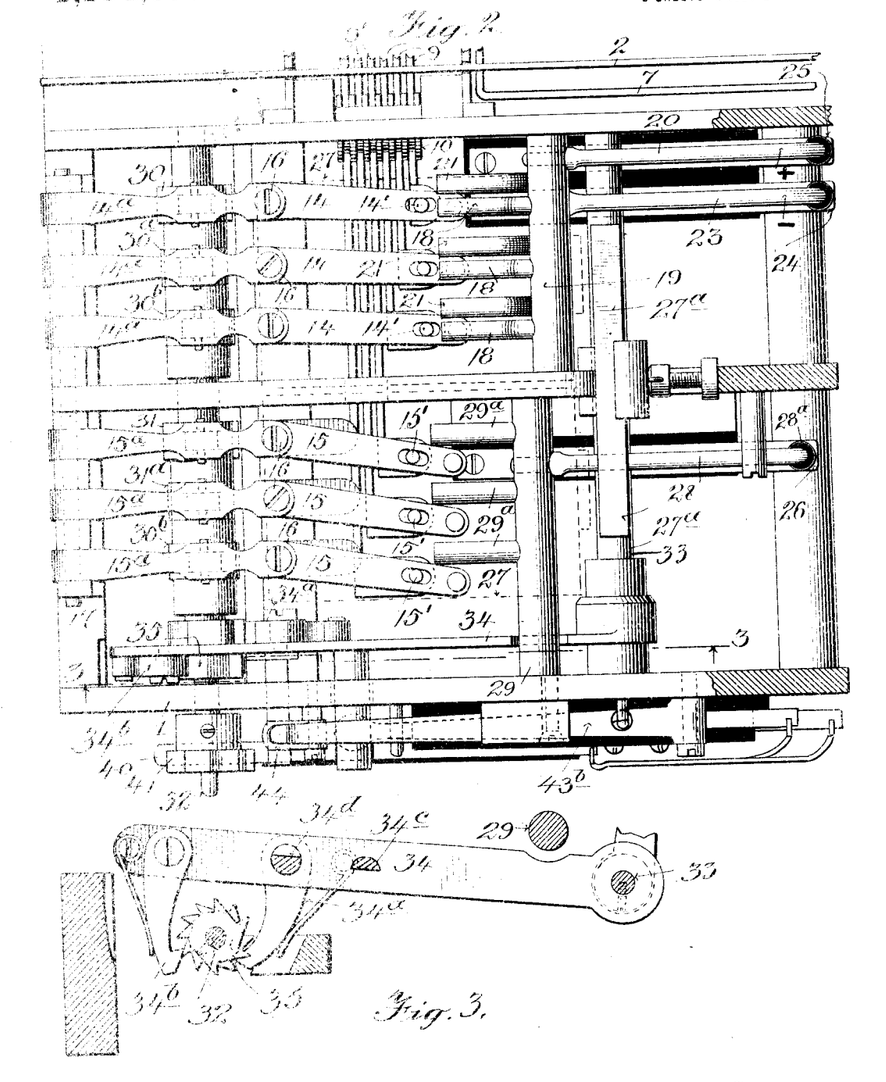
Fig. 3 is a section on the line 3, 3, in Fig. 2.
Figure 6:
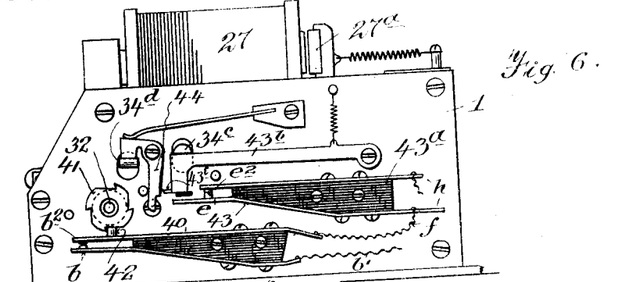
Fig. 6 is an end view looking from the right in Fig. 1.
Figure 7:
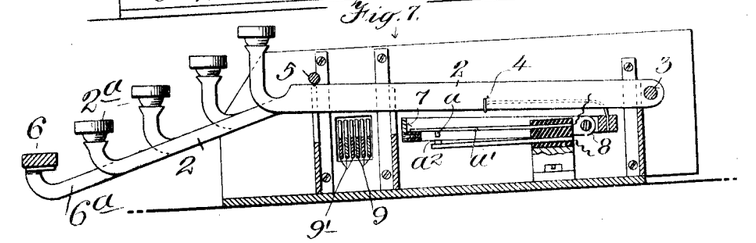
Fig. 7 is a section on the line 7, 7, in Fig. 1.
Figure 11:
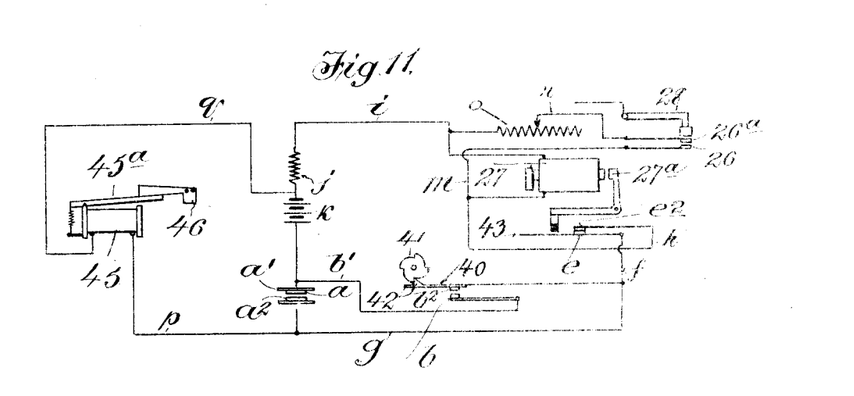
Fig. 11 is a diagram of circuits utilized with my improvements.

The circuits for controlling the operation of magnet 27 and the character of impulse sent on the line upon the operation of a finger key, and also to assure or maintain the bars 9, 9' in an operated position, are as follows: The contact $a$, shown carried by spring $a'$ having a downward tendency (Figs. 1 and 7), is normally opened by contact of universal bar 7 with spring $a'$, and when a key is depressed, circuits of magnets 27 and 45 are closed and upon the rise of such key to normal said circuits are broken at $a$. Contact $a$ is connected by a wire $b'$ with normally open contact $b$, the companion contact $b^2$ being shown carried by spring 40 supported upon insulation carried by frame 1 (Fig. 6). The cam 41 (shown having four cam members) secured upon shaft 32 (Fig. 6) coacts with a pin 42 on spring 40, to cause circuit at $b$, $b^2$ to be closed and held closed during one-quarter rotation of shaft 32, and to open the circuit when the parts are in the positions shown in Fig. 6. Contact $b^2$ is connected by wire $f$ with a normally closed contact $e$, and said wire is connected by wire $g$ with contact $e^2$, (Fig. 11). Contact $e$ is shown carried by spring 43 secured on insulation 43$^a$ carried by frame 1, and contact $e^2$ is in normal engagement with contact $e$. Circuit at $e$ is broken (each time arm 34 is depressed) by the action of lever 43$^b$ (Fig. 6) whose insulation engages spring 43 each time a projection 34$^c$ from arm 34 engages and depresses lever 43$^b$, on the down stroke of arm 34. A spring-pressed latch 44 is adapted to engage projection 43$^c$ of lever 43 when the latter is depressed, to hold said lever down and contact $e$ open until a projection 34$^d$ of arm 34 (Figs. 3 and 6), on the upstroke of said arm, engages latch 44 to release projection 43$^c$ and permit lever 43$^b$ to rise and permit closing of the circuit at $e$. Contact $e^2$ is connected by wire $h$ with one terminal of magnet 27, the other terminal of which magnet is connected by wire $i$, through resistance $j$, to one side of battery $k$, the other side of said battery being connected with contact $a$, (Fig. 11). The terminal of magnet 27 connected with wire $h$ is also connected by wire $m$ with normally open contact 26, the companion contact 26$^a$ being connected by wire $n$ with variable resistance $o$ connected with wire $l$ (Fig. 11). The circuit $m$, $n$, $o$, the contacts 26, 26$^a$, and the operating means therefor are, as will hereinafter appear, for the purpose of short-circuiting the magnet 27 to vary the duration of impulse transmitted. If, therefore, it is desired to transmit impulses of constant duration these parts may be omitted.

Figure 8:
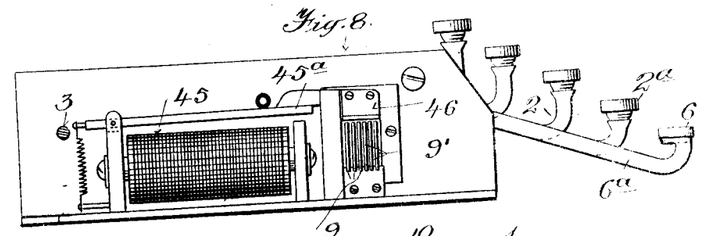
Fig. 8 is an end view looking from the left in Fig. 1.

A magnet 45, connected by wires $p$ and $q$ in the circuit of battery $k$ and contacts $a$, $a^2$, is adapted to control means for retaining the bars 9, 9′ in set position when operated by a finger key. For this purpose the armature 45ᵃ of magnet 45 (Figs. 8 and 10) is provided with a finger 46, in alinement with notches or recesses 9ʰ of bars 9, 9′ (Fig. 10), adapted, when said magnet is energized and bars 9, 9′ are in their normal positions to enter said notches and retain said bars from movement. Bars 9, 9′ also are shown provided with inclined edges 9ⁱ (Fig. 10) adapted to be engaged by finger 46 when said bars are shifted to the left in Fig. 10, whereby at such time, when magnet 45 is energized and the edge 9ⁱ of a bar 9 or 9′ has been shifted by a finger key to the left in Fig. 10, finger 46 will engage edge 9ⁱ and retain such bar in its shifted position.

The operation may be described as follows: It will be understood that with the arrangements illustrated three impulses are to be sent upon the line for each character transmitted, which impulses may be positive or negative in the sequence required, and of long or short duration; hence if a key is depressed corresponding to short impulses for the line the members 15 will not be shifted, and magnet armature 27ᵃ will operate quickly, but if one or more of the impulses for a character transmitted is or are to be of long duration, then one or more bars 9′ will be shifted by the key to cause the corresponding member 15 to pass under the corresponding projection 29ᵃ to close the circuit at 26, causing slow movement of armature 27ᵃ from the magnet 27, thereby causing one or more long impulses on the line. Likewise, if the character to be transmitted utilizes all positive current, then the members 14 will not be shifted, but if such impulses utilize negative current, then the members 14 will be shifted beneath the corresponding projections 21, and if one or two impulses for a character are to be negative and one or two impulses for such character positive, then one or two of the members 14 will be shifted beneath the corresponding projection 21, and so on. Assuming that a character is to be transmitted utilizing one negative, and two positive impulses, all of short duration, then when the corresponding finger key is depressed one of the bars 9 will be shifted to the left in Fig. 1, causing its member 14 (such as the upper member 14, Fig. 2) to pass under the corresponding projection 21 the other two bars 9 remaining stationary, and none of the bars 9′ and members 15 will be shifted. Upon the depression of such key circuit will be closed at $a$, and thereupon current will flow from the battery through $a$, $g$, $e$, $e^2$, $h$, through magnet 27, wire $i$, and resistance $j$ to the battery, also through $p$, 45 and $q$ to battery. Magnets 45 and 27 will now be energized, and upon the attraction of armature 45ᵃ its projection 46, by engaging the edge 9ⁱ of the shifted bar 9 and by entering recesses 9ʰ of the bars 9, 9′, that were not moved, will cause said bars to be locked in position; and magnet 27 will, by depressing arm 34, cause shaft 32 and its cams to rotate one step, and cam 41 will immediately act upon pin 42 to connect $b^2$ through conductor $b'$ with battery $k$, whereupon projection 34ᶜ acting upon lever 43ᵇ causes the circuit of magnet 27 to be broken only at $e$, and latch 44, engaging projection 43ᵃ, causes the circuit to remain open at $e$ until armature 27ᵃ returns to normal position, during which return of said armature as arm 34 is raised, the ratchets 35 are moved a further step, the circuit of magnet 27 remaining closed at $b$, during which steps of shaft 32 and the cams, the cam 30 (Fig. 2) will have caused its member 14 to be raised and lowered to close and open the circuit at 24 to transmit a negative impulse on the line and of short duration (because contact 26 is not now brought into action). When arm 34 has reached the limit of its upward stroke, its projection 34ᵈ trips the latch 44, thus releasing lever 43ᵇ and permitting the circuit to be again closed at $e$, thereby causing the magnet 27 to be again energized, whereupon the same operations are repeated for a further step by step rotation of shaft 32, causing the intermediate unshifted member 14 to operate the corresponding projection 18, thereupon closing circuit at 25 and transmitting positive current on the line (of short duration), the circuits still remaining closed at $b$, and when the circuit through 27 has been again closed at $e$ magnet 27 will be energized again with a like result, causing shaft 32 to rotate a further step forward, thereby causing the lower member 14 (Fig. 2) to engage the corresponding projection 18 and cause closing of the circuit again, causing a second positive impulse on the line (but of short duration). At about the termination of the third up stroke of arm 34 the member of cam 41 which has been holding the circuit closed at $b$ advances and permits the circuits to be broken. The parts will have all been restored to their normal positions, and there thus will have been transmitted, for three step by step movements of shaft 32, three impulses on the line. During such time, if the finger key had been released, the bar 9 that was operated by the key would have been retained in set position by the projection 46 of armature 45ᵃ having remained down, due to the circuit of magnet 45 having been kept closed at $b$, such circuit then being from the battery through $a$, $b'$, $b$, $b^2$, 40, $g$, $p$, magnet 45 and $q$, back to the battery, but as soon as the circuit has been broken at $b$ and magnet 45 deënergized, the projection 46 and its armature will have released all the bars 9, 9' and permitted the operated bar to be moved back to normal by its spring 12. Likewise, if upon the depression of a key two of the members 14 are shifted under their corresponding projections 21, then two negative and one positive impulse will be sent on the line for the depression of a key, and if three bars 9 are shifted by a key then three negative impulses will be sent on the line for the depression of such key, all of which would have been of short duration. If, however, upon the depression of a finger key an impulse of long duration is to be transmitted on the line, irrespective of whether the current sent be positive or negative, then, upon the depression of a finger key that controls, say, one of the bars 9' (irrespective of the movement of a bar 9) the movement of such bar 9' will cause the shifting of the corresponding member 15 beneath the corresponding projection $29^a$.

Assuming that the upper member 15 (Fig. 2) is shifted by its bar 9' beneath the corresponding member $29^a$, and that the upper member 14 (Fig. 2) is shifted, then a negative impulse of long duration will first pass on the line upon the closing of the circuit at $a$, as follows: Upon the rising of the aforesaid upper members 14 and 15, the operation of sending a negative impulse on the line will be as before stated, but on the rising of said member 15, with such member 14, arm 28 causes the circuit to be closed at 26, thus short circuiting magnet 27, through $m$, 26, $26^a$, $n$, and resistance, $o$, thereby causing the armature $27^a$ to stick at the pole piece of the magnet for a definite period, during which period a long negative impulse is caused to flow on the line, but the battery is not short circuited on account of the resistance $j$. Upon the next two steps forward of cams $30^a$ and $31^a$ impulses of short duration will be sent on the line, because the said upper arm 15 will not then be operated, and because the two other arms 15 are not beneath projections $29^a$. If, however, two members 15 should be shifted upon the stroke of a finger key, then two long impulses and one short impulse will be given of either positive or negative character according to the positions of the members 14, and so likewise if the three members 15 are shifted by the operation of a key, three long impulses will be thrown on the line, regardless of the positions of members 14. It will thus be understood that by means of three bars 9 each controlling a member 14, and three bars 9', each controlling a member 15, the members 14 controlling the character of current, such as positive or negative, thrown on the line according to the position of the corresponding member respecting its corresponding projections 18 and 21, and the members 15, if not shifted, permitting a short impulse to be sent, and if shifted causing a long impulse to be sent, on the line, the desired character of impulse of the desired duration is regulated or controlled, according to how the keys are caused to shift one or more bars 9 or one or more bars 9'. If one of the keys or the spacing bar does not shift any of the bars 9, 9' then upon closing circuit at $a$, three impulses of short duration and positive current will be thrown on the line.

While I have illustrated my invention as adapted to cause three impulses of varying direction and duration to be sent on the line each time a key or space bar is depressed, whereby a receiving instrument, adapted to operate (for instance) a type controlling mechanism, may operate upon the receipt of three impulses of appropriate direction and duration, it will be understood that the key controlling bars, the shifting members and the contacts controlled thereby, and the corresponding cams, may be more or less in number, to cause more or less impulses to be sent on the line, on the depression of a key, or space bar, and may be so arranged as to transmit successive impulses of the same direction and duration.

Having now described my invention what I claim is:—

1. A telegraph transmitter comprising keys, contacts to transmit one character of current, contacts to transmit a different character of current, means controlled by said keys to cause either of said contacts to be closed successively or to close said contacts alternately, and means controlled by said keys to vary the duration of the impulses transmitted through said contacts.

2. A telegraph transmitter comprising keys, a plurality of contacts to cause impulses of different character respectively to be transmitted, a plurality of members to enable actuation of said contacts, each member being adapted to actuate either of said contacts, means controlled by said keys to actuate said members, mechanism to operate said members, and means controlled by said mechanism to control the duration of the impulses thrown on the line by said contacts.

3. A telegraph transmitter comprising keys, make and break contacts, mechanism controlled by said keys for causing operation of said contacts, and mechanism independent of the first named mechanism controlled by said keys for changing the duration of engagement of said contacts.

4. A telegraph transmitter comprising keys, make and break contacts, mechanism controlled by said keys for causing operation of said contacts, and mechanism normally causing impulses of one duration to be transmitted by said contacts and adapted to be operated by said keys to cause impulses of a different duration to be transmitted by said contacts.

5. A telegraph transmitter comprising keys, make and break contacts, mechanism controlled by said keys for causing operation of said contacts, other make and break contacts, a member to actuate the latter, and mechanism controlled by said keys to operate said member to cause the latter to vary the engagement of the first named contacts.

6. A telegraph transmitter comprising keys, make and break contacts, mechanism controlled by said keys for causing operation of said contacts, other make and break contacts, a plurality of members normally in position with respect to the second named contacts to permit impulses of one duration to be transmitted by the first named contacts, and means actuated by said keys to shift said members with respect to the second named contacts to cause impulses of a different duration to be sent by the first named contacts.

7. A telegraph transmitter comprising keys, make and break contacts, mechanism controlled by said keys for causing operation of said contacts, other make and break contacts, a plurality of members normally out of operative relation to said second named contacts to permit impulses of one duration to be sent by the first named contacts, and means actuated by said keys to operate said members with respect to the second named contacts to cause impulses of a different duration to be sent by the first named contacts.

8. A telegraph transmitter comprising keys, a plurality of contacts adapted respectively to transmit positive and negative current, means controlled by said keys to cause a plurality of positive or negative impulses to be successively transmitted by said contacts respectively of short duration, and means controlled by said keys to cause impulses transmitted by said contacts to be of long duration.

9. A telegraph transmitter comprising keys, a plurality of contacts adapted respectively to transmit positive and negative current, means controlled by said keys to cause a plurality of successive impulses of different character to be transmitted by said contacts, and means controlled by said keys to cause impulses transmitted by said contacts to be successively of similar or different duration.

10. A telegraph transmitter comprising keys, two pairs of contacts, each pair of contacts being adapted to transmit current of different character, a member to actuate said contacts, means controlled by said keys to shift said member to enable actuation of one or the other pair of contacts, another pair of contacts, means to cause the last named contacts to vary the duration of the impulses transmitted by either of the first named pair of contacts, a member to control the second named pair of contacts, means controlled by said keys to cause said member to enable actuation of the last named contacts, and means to operate said members.

11. A telegraph transmitter comprising two pairs of contacts, each pair of contacts being adapted to transmit current of different character, a member to actuate said contacts, means controlled by said keys to shift said member to enable actuation of one or the other pair of contacts, another pair of contacts, means to cause the last named contacts to vary the duration of the impulses transmitted by either of the first named pair of contacts, a member to control the second named pair of contacts, means controlled by said keys to cause said member to enable actuation of the last named contacts, and means to operate said members, said last named means being controlled by the second named means.

12. A telegraph transmitter comprising two pairs of contacts, each pair of contacts being adapted to transmit current of different character, a member to actuate said contacts, means controlled by said keys to shift said member to enable actuation of one or the other pair of contacts, another pair of contacts, means to cause the last named contacts to vary the duration of impulses transmitted by either of the first named pair of contacts, a member to control the second named pair of contacts, means controlled by said keys to cause said member to enable actuation of the last named contacts, means to operate said members, said last named means being controlled by the second named means, and means to retain said key controlled means in set positions during operation of said contacts.

13. A telegraph transmitter comprising keys, two pairs of contacts, one pair of contacts being adapted to transmit current of different character from that transmitted by the other pair of contacts, a projection connected with a contact of each pair of contacts, a member adapted to operate said projections, means controlled by said keys to shift said member to and from the projections of said contacts, electrically operating means to cause said member to operate said projections to actuate said contacts, and means actuated by said keys for controlling the circuits of said electrically operating means.

14. A telegraph transmitter comprising keys, two pairs of contacts, one pair of contacts being adapted to transmit current of different character from that transmitted by the other pair of contacts, a projection connected with a contact of each pair of contacts, a member adapted to operate said projections, means controlled by said keys to shift said member to and from the projections of said contacts, electrically operating means to cause said member to operate said projections to actuate said contacts, another pair of contacts, means to cause the last named contacts to vary the duration of the impulses transmitted by either of the first named pair of contacts, said means being controlled by said electrically operating means, and means actuated by said keys for controlling the circuit of said electrically operating means.

15. A telegraph transmitter comprising keys, two pairs of contacts, one pair of contacts being adapted to transmit current of different character from that transmitted by the other pair of contacts, a projection connected with a contact of each pair of contacts, a member adapted to operate said projections, means controlled by said keys to shift said member to and from the projections of said contacts, electrically operating means to cause said member to operate said projections to actuate said contacts, another pair of contacts, a member to cause the last named contacts to vary the duration of the impulses transmitted by either of the first named pair of contacts, means controlled by said keys to shift said member with respect to the last named contacts, said member being controlled by said electrically operating means, and means actuated by said keys for controlling the circuit of said electrically operating means.

16. A telegraph transmitter comprising keys, two pairs of contacts, one pair of contacts being adapted to transmit current of different character from that transmitted by the other pair of contacts, a plurality of projections connected with a contact of each pair of contacts, members each adapted to operate a projection of said pairs of contacts, means controlled by said keys to separately shift said members to and from the corresponding projections of said pairs of contacts, electrically operating means to cause said members to operate said projections to actuate said contacts, means actuated by said keys for controlling the circuit of said electrically operating means, another pair of contacts, and means to cause the last named contacts to vary the duration of the impulses transmitted by either of the first named pairs of contacts.

17. A telegraph transmitter comprising keys, two pairs of contacts, one pair of contacts being adapted to transmit current of different character from that transmitted by the other pair of contacts, a plurality of projections connected with a contact of each pair of contacts, members each adapted to operate a projection of said pairs of contacts, means controlled by said keys to separately shift said members to and from the corresponding projections of said pairs of contacts, electrically operating means to cause said members to operate said projections to actuate said contacts, another pair of contacts, means controlled by said electrically operating means to operate the last named contacts to vary the duration of impulses transmitted by the first named contacts, and means actuated by said keys for controlling the circuit of said electrically operating means.

18. A telegraph transmitter comprising keys, two pairs of contacts, a member adapted to operate either of said pairs of contacts, a bar connected with said member to shift the same, means to permit said bar to be shifted by said keys, an arm movably carrying said member, a cam to operate said arm, electrically operating devices to rotate said cam, and means actuated by said keys for controlling the circuit of said electrically operating means.

19. A telegraph transmitter comprising keys, two pairs of contacts, a member adapted to operate either of said pairs of contacts, a bar connected with said member to shift the same, means to permit said bar to be shifted by said keys, an arm movably carrying said member, a cam to operate said arm, electrically operating devices to rotate said cam, another pair of contacts, a member to operate said contacts, a bar connected with the last named member to shift the same, means to permit said bar to be shifted by said keys, an arm movably carrying the last named member, a cam to operate said arm and rotated by said electrically operating devices, and means actuated by said keys for controlling the circuit of said electrically operating means.

20. A telegraph transmitter comprising keys, two pairs of contacts, a member adapted to operate either of said pairs of contacts, a bar connected with said member to shift the same, means to permit said bar to be shifted by said keys, an arm movably carrying said member, a cam to operate said arm, another pair of contacts, a member to operate said contacts, a bar connected with the last named member to shift the same, means to permit said bar to be shifted by said keys, an arm movably carrying said last named member, a cam to operate said arm and connected with the first named cam, electrically operating devices to rotate said cams in unison, and means actuated by said keys for controlling the circuit of said electrically operated devices.

21. A telegraph transmitter comprising keys, two pairs of contacts, a member adapted to operate either of said pairs of contacts, a bar connected with said member to shift the same, means to permit said bar to be shifted by said keys, an arm movably carrying said member, a cam to operate said arm, another pair of contacts, a member to operate said contacts, a bar connected with the last named member to shift the same, means to permit said bar to be shifted by said keys, an arm movably carrying the last named member, a cam to operate said arm and connected with the first named cam, a magnet, means for causing said magnet to rotate said cams step by step in unison, and means actuated by said keys for controlling the circuit of said magnet.

22. A telegraph transmitter comprising keys, two pairs of contacts, a member adapted to operate either of said pairs of contacts, a bar connected with said member to shift the same, means to permit said bar to be shifted by said keys, an arm movably carrying said member, a cam to operate said arm, another pair of contacts, a member to operate said contacts, a bar connected with the last named member to shift the same, means to permit said bar to be shifted by said keys, an arm movably carrying the last named member, a cam to operate said arm and connected with the first named cam, a magnet, means for causing said magnet to rotate said cams step by step in unison, means actuated by said keys for controlling the circuit of said magnet, and means controlled by the second named contacts to cause retarded operation of the armature of said magnet to retard the rotation of said cams to cause a long impulse to be sent on the line by a pair of the first named contacts.

23. A telegraph transmitter comprising keys, two pairs of contacts, a member adapted to operate either of said pairs of contacts, a bar connected with said member to shift the same, means to permit said bar to be shifted by said keys, an arm movably carrying said member, a cam to operate said arm, another pair of contacts, a member to operate said contacts, a bar connected with the last named member to shift the same, means to permit said bar to be shifted by said keys, an arm movably carrying the last named member, a cam to operate said arm and connected with the first named cam, a magnet, means for causing said magnet to rotate said cams step by step in unison, means actuated by said keys for controlling the circuit of said magnet, and means controlled by the second named contacts to short circuit said magnet to cause retarded operation of its armature to retard the rotation of said cams to cause a long impulse to be sent on the line by a pair of the first named contacts.

24. A telegraph transmitter comprising two pairs of contacts, one pair of contacts being adapted to transmit current of different character from that transmitted by the other pair of contacts, a plurality of projections connected with a contact of each pair of contacts, members each adapted to operate a projection of said pairs of contacts, means controlled by said keys to separately shift said members to and from the corresponding projections of said pairs of contacts, another pair of contacts, a plurality of projections connected with one of said contacts, members each adapted to operate one of said projections, means controlled by said keys to separately shift said members to and from the corresponding projections, cams connected together to rotate in unison, each cam being adapted to operate one of said members, electrically operating means to rotate said cams step by step, and means actuated by said keys to control the circuit of said electrically operating means.

25. A telegraph transmitter comprising keys, two pairs of contacts, one pair of contacts being adapted to transmit current of different character from that transmitted by the other pair of contacts, a plurality of projections connected with a contact of each pair of contacts, members each adapted to operate a projection of said pairs of contacts, means controlled by said keys to separately shift said members to and from the corresponding projections of said pairs of contacts, another pair of contacts, a plurality of projections connected with one of said contacts, members each adapted to operate one of said projections, and means controlled by said keys to separately shift said members to and from the corresponding projections, cams connected together to rotate in unison, each cam being adapted to operate one of said members, said cams of the first and second named members being arranged to operate in pairs to simultaneously operate one of the first and second named members.

26. A telegraph transmitter comprising keys, two pairs of contacts, one pair of contacts being adapted to transmit current of different character from that transmitted by the other pair of contacts, a plurality of projections connected with a contact of each pair of contacts, members each adapted to operate a projection of said pairs of contacts, means controlled by said keys to separately shift said member to and from the corresponding projections of said pairs of contacts, another pair of contacts, a plurality of projections connected with one of said contacts, members each adapted to operate one of said projections, means controlled by said keys to separately shift said members to and from the corresponding projections, cams connected together to rotate in unison, each cam being adapted to operate one of said members, said cams of the first and second named members being arranged to operate in pairs to simultaneously operate one of the first and second named members, and means controlled by said keys to retain said members in shifted positions while the corresponding cams operate said members.

27. A telegraph transmitter comprising keys, a pair of line contacts, a member to operate said contacts, means controlled by said member to permit said member to operate either of said contacts, a magnet, means operated by said magnet to cause said member to actuate said contacts, another pair of contacts, a member to operate said contacts, means controlled by said keys to permit said member to operate the second named contacts, means operated by said magnet to cause said member to actuate said contacts, means operated by said keys to control the circuit of said magnet, means operated by said magnet to control its circuit, and a short circuit for said magnet controlled by the second named contacts to cause long impulses to be transmitted through the first named contacts.

28. A telegraph transmitter comprising keys, a pair of line contacts, means actuated by said keys to control the operation of said contacts, a magnet, means operated by said magnet to cause operation of said contacts, means actuated by said keys for controlling the circuit of said magnet, means operated by said magnet to control its circuit, another pair of contacts, and means controlled by the last named contacts to cause retarded operation of the armature of said magnet to cause long impulses to be transmitted by the first named contacts.

29. A telegraph transmitter comprising keys, a pair of line contacts, means actuated by said keys to control the operation of said contacts, a magnet, means operated by said magnet to cause operation of said contacts, means actuated by said keys for controlling the circuit of said magnet, means operated by said magnet to control its circuit, another pair of contacts, means actuated by said keys to control the operation of the last named contacts, and means controlled by the last named contacts to cause retarded operation of the armature of said magnet to cause long impulses to be transmitted by the first named contacts.

30. A telegraph transmitter comprising keys, a pair of line contacts, means actuated by said keys to control the operation of said contacts, a magnet, means operated by said magnet to cause operation of said contacts, means actuated by said keys for controlling the circuit of said magnet, means operated by said magnet to control its circuit, another pair of contacts, means actuated by said keys to control the operation of the last named contacts, and a short circuit around said magnet including the last named contacts to cause retarded operation of the armature of said magnet to cause long impulses to be transmitted by the first named contacts.

31. A telegraph transmitter comprising keys, line contacts, means actuated by said keys to control the operation of said contacts, a magnet, means operated by said magnet to actuate said contacts, a circuit for said magnet, normally closed contacts in said circuit, means operated by said magnet to successively actuate said normally closed contacts, normally open contacts in said circuit, means actuated by said magnet to close and hold the last named contacts closed while the first named contacts of said magnet circuit open and close said circuit a predetermined number of times, and to then break said circuit.

32. A telegraph transmitter comprising keys, line contacts, means actuated by said keys to control the operation of said contacts, a magnet, means operated by said magnet to actuate said contacts, a circuit for said magnet, normally closed contacts in said circuit, means operated by said magnet to successively actuate said normally closed contacts, normally open contacts in said circuit, means actuated by said magnet to close and hold the last named contacts closed while the first named contacts of said magnet circuit open and close said circuit a predetermined number of times, and to then break said circuit, another magnet, means controlled by the last named magnet to retain set said means controlled by said keys, and a circuit for the last named magnet controlled by said keys.

33. A telegraph transmitter comprising keys, line contacts, means actuated by said keys to control the operation of said contacts, a magnet, means operated by said magnet to actuate said contacts, a circuit for said magnet, normally closed contacts in said circuit, means operated by said magnet to successively actuate said normally closed contacts, normally open contacts in said circuit, means actuated by said magnet to close and hold the last named contacts closed while the first named contacts of said magnet circuit open and close said circuit a predetermined number of times, and to then break said circuit, another pair of contacts, means actuated by said keys to control the last named contacts, means operated by said magnet to actuate the last named contacts, and means controlled by the second named contacts to cause retarded operation of the armature of said magnet to cause long impulses to be transmitted by the first named contacts.

34. A telegraph transmitter comprising keys, line contacts, means actuated by said keys to control the operation of said contacts, a magnet, means operated by said magnet to actuate said contacts, a circuit for said magnet, normally closed contacts in said circuit, means operated by said magnet to successively make and break said circuit, normally open contacts in said circuit, means actuated by said magnet to close and hold the last named contacts closed while the first named contacts of said magnet circuit open and close said circuit a predetermined number of times, and to then break the circuit, another pair of contacts, means actuated by said keys to control the last named contacts, means operated by said magnet to actuate the last named contacts, and means controlled by the last named contacts to short circuit said magnet to cause retarded operation of its armature to cause long impulses to be transmitted by the first named contacts.

35. A telegraph transmitter comprising keys, contacts for a line circuit, means actuated by said keys to control said contacts, a magnet, means actuated by said magnet to operate said contacts, a circuit for said magnet having normally closed contacts and normally open contacts, an arm operated by said magnet, means operated by said arm to successively make and break the first named contacts of said magnet circuit, a cam operated by said arm to close and temporarily hold closed the second named contacts of said magnet circuit, and means operated by said arm to intermittently rotate said cam.

36. A telegraph transmitter comprising keys, contacts for a line circuit, means actuated by said keys to control said contacts, a magnet, means actuated by said magnet to operate said contacts, a circuit for said magnet having normally closed contacts and normally open contacts, an arm operated by said magnet, a lever to be intermittently operated by said arm to make and break the first named contacts of the magnet circuit, a latch to temporarily retain said contacts broken, means operated by said arm to cause said latch to release said lever to permit closing of said magnet circuit, a cam to close the second named contacts of the magnet circuit and retain them closed during the operation of the first named contacts of said magnet circuit, and means operated by said arm to rotate said cam step by step.

37. A telegraph transmitter comprising keys, make and break contacts, means actuated by said keys to control said contacts, a magnet, means actuated by said magnet to operate said contacts, a circuit for said magnet having means to make and break its circuit, said circuit having contacts, and means controlled by said keys for controlling said circuit of said magnet at said contacts.

38. A telegraph transmitter comprising keys, make and break contacts, means actuated by said keys to control said contacts, a magnet, means actuated by said magnet to operate said contacts, a circuit for said magnet having means to make and break its circuit, said circuit having contacts, means controlled by said keys for controlling said circuit at said contacts, a magnet, devices operated by said magnet to retain said first named means in set position, and a circuit for said magnet controlled by said keys.

39. A telegraph transmitter comprising keys, make and break contacts, bars actuated by said keys for controlling said contacts, said bars having recesses and edges, a magnet, a finger controlled by said magnet, to enter said recesses to retain said bars in normal positions and to engage said edges to retain said bars in shifted positions, a circuit for said magnet, and means actuated by said keys to control said circuit.

40. A telegraph transmitter comprising keys, make and break contacts, bars actuated by said keys for controlling said contacts, said bars having recesses alined in the normal positions of the bars and having edges alined in the normal positions of the bars, a magnet, the armature of said magnet having a finger adapted to enter said recesses to retain the corresponding bars in normal positions and adapted to engage said edges to retain the corresponding bars in shifted positions, a circuit for said magnet, and means actuated by said keys for controlling said circuit.

41. In a telegraph transmitter, means for controlling the transmission of electric impulses comprising a plurality of shiftable bars; a plurality of keys, each of which is adapted, when depressed, to shift one or more of said bars; and means operated by the depression of any key for contacting with and locking the bars in shifted or normal position.

42. In a telegraph transmitter, means for controlling the transmission of electric impulses comprising a plurality of shiftable bars; a plurality of keys, each of which, when depressed, is adapted to shift one or more of said bars; a magnet; means controlled by said magnet to contact with and retain the bar or bars in shifted position; and a circuit for said magnet adapted to be closed by the depression of any of said keys.

43. In a telegraph transmitter, means for controlling the transmission of electric impulses comprising a plurality of shiftable bars; a plurality of keys each of which is adapted, when depressed, to shift one or more of said bars; a magnet; means controlled by said magnet to contact with and retain the bar or bars in shifted position; a contact-closing device; a magnet for operating said device; and common means controlled by the depression of any of said keys for rendering effective both of said magnets.

44. In a telegraph transmitter, means for controlling the transmission of electric impulses comprising a plurality of movable members, a plurality of keys each of which is adapted, when depressed, to actuate one or more of said members, a magnet, contacts in the circuit of said magnet closed directly through the operation of any of said keys, means controlled by said magnet to retain the member or members in shifted position, a second magnet, means controlled by the depression of any of said keys for causing the operation of the second magnet, and electrically operating devices controlled by said second magnet.

45. In a telegraph transmitter, means for controlling the transmission of electric impulses comprising a plurality of movable members, a plurality of keys each of which is adapted, when depressed, to actuate one or more of said members, a magnet, means to directly cause operation of said magnet upon the operation of one of said keys, means controlled by said magnet to retain the member or members in shifted position, electrically operating means, and means controlling said electrically operating means directly upon the depression of one of said keys.

46. In a telegraph transmitter, means for controlling the transmission of electric impulses comprising a plurality of movable members, a plurality of keys each of which is adapted, when depressed, to actuate one or more of said members, a magnet, means to directly cause operation of said magnet upon the operation of one of said keys, means controlled by said magnet to retain the member or members in shifted position, electrically operating means, and means controlling said electrically operating means directly upon the depression of one of said keys and simultaneously with the operation of the first named magnet.

47. In a telegraph transmitter, means for controlling the transmission of electric impulses comprising a plurality of shiftable bars; a plurality of keys, each of which is adapted, when depressed, to shift one or more of said bars; means operated by the depression of any key for contacting with and locking the bar or bars in shifted or normal position; intermittently operative contact-closing means; and means for retaining said locking means in locking position throughout a single operation of the contact-closing means.

48. A transmitter of the class described, comprising a plurality of contacts, a shaft, a plurality of cams spaced apart upon said shaft in varying positions for respectively operating said contacts, means to rotate said shaft intermittently and means to vary the time of closing any of said contacts.

49. A transmitter of the class described comprising a plurality of contacts, a shaft, a plurality of cams spaced apart upon said shaft in varying positions for respectively operating said contacts, means to rotate said shaft intermittently, electrically controlled devices for operating said means and means to vary the time of closing any of said contacts.

50. The combination of a magnet, contacts in the circuit of said magnet, a member operative by said magnet, an arm adapted to break said contacts, means to cause said member to operate said arm, means to retain said arm in operated position, and means operated by said member to release said arm.

51. The combination of a magnet, contacts in the circuit of said magnet, a member operative by said magnet, an arm adapted to break said contacts, means to cause said member to operate said arm, a latch, means to cause said latch to retain said arm in operated position, and means to release said latch by the operation of said member.

52. The combination of a magnet, contacts in the circuit of said magnet, a member operative by said magnet, an arm adapted to break said contacts, means to cause said member to operate said arm, means to retain said arm in operated position, means operated by said member to release said arm, normally open contacts associated with said magnet, and means operated by said member to cause closing and opening of said contacts.

53. The combination of a magnet, contacts in the circuit of said magnet, a member operative by said magnet, an arm adapted to break said contacts, means to cause said member to operate said arm, means to retain said arm in operated position, means operated by said member to release said arm, other contacts in the magnet circuit, a rotative member normally holding said other contacts inoperative, and means operated by the first named member to actuate the rotative member for closing and opening said other contacts.

54. A transmitter of the class described comprising a plurality of contacts; a shaft; a plurality of cams spaced apart on said shaft in varying positions for respectively operating said contacts; and means to rotate said shaft intermittently comprising a magnet, contacts in the circuit of said magnet; a member operative by said magnet; an arm adapted to break said contacts; means to cause said member to operate said arm; means to retain said arm in operated position; and means operated by said member to release said arm.

55. A transmitter of the class described comprising a plurality of contacts; a shaft; a plurality of cams spaced apart on said shaft in varying positions for respectively operating said contacts; and means to rotate said shaft intermittently comprising a magnet, contacts in the circuit of said magnet; a member operative by said magnet; an arm adapted to break said contacts; means to cause said member to operate said arm; a latch; means to cause said latch to retain said arm in operated position; and means to release said latch by the operation of said member.

56. In a telegraph transmitter, the combination of keys for controlling the transmission of impulses, a plurality of contacts, a magnet, means actuated by said magnet to operate said contacts, a circuit for said magnet, normally open contacts in said circuit adapted to be closed upon the depression of any key, and normally closed contacts in said circuit adapted to be opened intermittently while the normally open contacts are closed.

57. In a telegraph transmitter, the combination of a plurality of contacts, a magnet, means operated by said magnet to actuate said contacts, a circuit for said magnet, normally closed contacts in said circuit, means operated by said magnet to successively actuate said normally closed contacts, normally open contacts in said circuit; means controlled by said magnet to close and hold the last named contacts closed while the first named contacts of said magnet circuit open and close said circuit a predetermined number of times, and to then break said circuit.

58. In a telegraph transmitter, the combination of a plurality of contacts, a magnet, means actuated by said magnet to operate said contacts, a circuit for said magnet having normally closed contacts and normally open contacts, an arm operated by said magnet, means operated by said arm to successively make and break the first named contacts of said magnet circuit, a cam operated by said arm to close and temporarily hold closed the second named contacts of said magnet circuit, and means operated by said arm to intermittently rotate said cam.

59. In a telegraph transmitter, the combination of a plurality of contacts, a magnet, means actuated by said magnet to operate said contacts, a circuit for said magnet having normally closed contacts and normally open contacts, an arm operated by said magnet, a lever to be intermittently operated by said arm to make and break the first named contacts of the magnet circuit, a latch to temporarily retain said contacts broken, means operated by said arm to cause said latch to release said lever to permit closing of said magnet circuit, a cam to close the second named contacts of the magnet circuit and retain them closed during the operation of the first named contacts of said magnet circuit, and means operated by said arm to rotate said cam step by step.

60. In a telegraph transmitter, the combination of a plurality of contacts, means for operating said contacts comprising a shaft with a plurality of cams mounted thereon, and means for rotating said shaft step by step, comprising a ratchet secured thereto; a pivoted arm; a pawl carried by the arm and adapted to coöperate with the ratchet; an electromagnet for oscillating said arm and means to vary the time of closing any of said contacts.

61. In a telegraph transmitter, the combination of a plurality of contacts; means for operating said contacts comprising a shaft with a plurality of cams mounted thereon; and means for rotating said shaft step by step comprising a ratchet secured thereto; a pivoted arm, a pawl carried by the arm adapted to coöperate with the ratchet; an electromagnet for moving said arm in one direction; a spring for moving it in the opposite direction; and means controlled by said arm for rendering the magnet alternately effective and ineffective.

62. In a telegraph transmitter, the combination of a plurality of contacts; means for operating said contacts comprising a shaft with a plurality of cams mounted thereon; and means for rotating said shaft step by step, comprising a ratchet secured thereto; a pivoted arm; a pawl carried by the arm and adapted to coöperate with the ratchet; an electromagnet for moving said arm in one direction; a circuit for said electromagnet including normally closed contacts adapted to be opened by the arm when moved by the electromagnet, a latch to retain said contacts open; and a spring to return the arm, said arm being adapted when returned to trip said latch and permit said contacts to close.

63. In a telegraph transmitter, the combination of a plurality of contacts; a device for operating said contacts comprising a shaft with a plurality of cams mounted thereon; electrically operated means for rotating said shaft step by step; a starting circuit and a working circuit for said electrically operated means, and means to control said circuits.

64. In a telegraph transmitter, the combination of a plurality of contacts; a device for operating said contacts comprising a shaft with a plurality of cams mounted thereon; electrically operated means for rotating said shaft step by step; a starting circuit for said means, means to control said starting circuit; a working circuit for said means; and means to maintain said working circuit operating until a complete cycle of operations of the contact operating device has terminated.

65. In a telegraph transmitter, the combination of a plurality of contacts; a device for operating said contacts comprising a shaft with a plurality of cams mounted thereon; electrically operated means for rotating said shaft step by step; a starting circuit for said means; a working circuit for said means; means to control said starting circuit; means to shift said first named means from the starting circuit to the working circuit after said means has started to operate; and means to maintain the working circuit closed until a complete cycle of operations of the contact operating device has terminated.

Signed at New York city, in the county of New York, and State of New York, this 14th day of January, A. D. 1913.

ALLEN D. CARDWELL.

Witnesses:
MARIE F. WAINWRIGHT,
T. F. BOURNE.